Nov. 25, 1952     A. PISCHINGER     2,619,042
FUEL INJECTION PUMP FOR DIESEL ENGINES
Filed Sept. 5, 1947
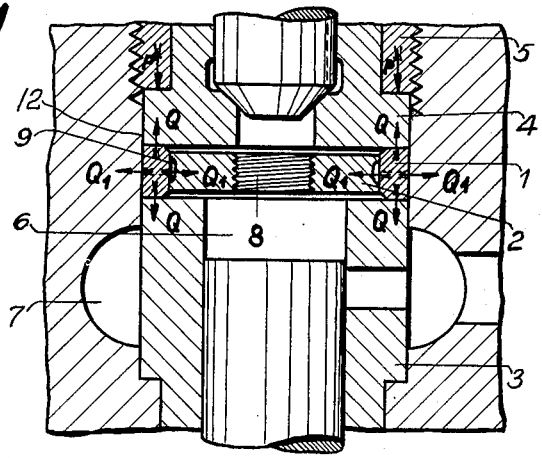
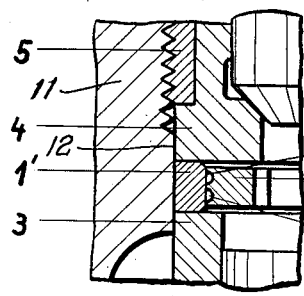 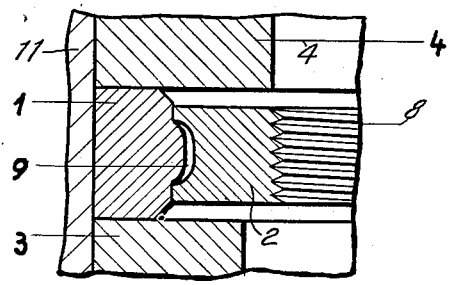
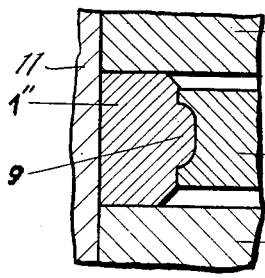 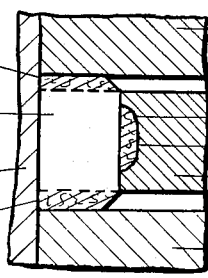 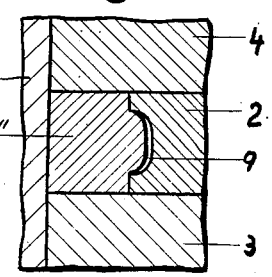
Inventor:
Anton Pischinger
by Singer, Ehlert, Stern
& Careburg, Attorneys.

Patented Nov. 25, 1952

2,619,042

UNITED STATES PATENT OFFICE 2,619,042

FUEL INJECTION PUMP FOR DIESEL ENGINES

Anton Pischinger, Graz, Austria

Application September 5, 1947, Serial No. 772,422
In Austria September 13, 1946

4 Claims. (Cl. 103—202)

The invention relates to fuel injection pumps for diesel engines and particularly to a packing ring intended to seal both in the axial and the radial direction whereby the pressures acting on the packing in both directions are produced by a force exclusively acting in the axial direction.

The invention substantially consists in that the packing is provided with a ring made of a material capable of exercising a sealing effect which, on the surface not used for sealing, is radially supported by a stiff ring. In this manner the deformation of the ring producing its sealing effect, is controlled by the supporting ring so that the packing snugly engages the faces to be sealed. Thus according to the inventive design a packing ring universally utilizable is created for sealing both in the axial and in the radial direction which may be advantageously applied without necessitating any alteration of the machine parts in question.

It is advisable that the supporting ring should be provided with at least one groove on its cylindrical surface coacting with the ring made of sealing material into which the latter telescopically engages either from the outset, or only after its deformation by the pressure exerted upon it. In case of packing rings in which the deformable ring is made of a plastic mass, the supporting ring, at least after the first assembly, forms a unit with the deformable or plastic ring so that the entire packing may be removed in a simple manner by means of an extracting device acting on the supporting ring. If e. g. the supporting ring is located at the inner side, the extraction may be performed by means of threads arranged in the central aperture of same.

Alternatively the plastic ring may be made of an elastic material in which case the ring may be removed after the extraction of the supporting ring, provided that it is not firmly connected to the latter.

The packing ring, according to the invention is especially suitable for sealing the pump piston cylinder and the delivery valve casing in fuel injection pumps for diesel engines.

In the drawing the invention is illustrated by way of an embodiment.

Fig. 1 shows the application of the inventive packing ring to a fuel injection pump, while Fig. 2 shows a portion of the Fig. 1 is an enlarged scale.

Figs. 3 to 6 illustrate modifications of the packing ring and supporting ring.

The ring 1 is arranged in a cylindrical bore 12 of the pump casing 11 and is made of a material capable of a sealing effect and co-acts with the inner supporting ring 2. According to the arrangement shown in Fig. 1 this ring—inserted between the pump piston cylinder 3 and the valve casing 4 which is acted upon by the tubular screw plug 5 inserted in the outer threaded end of the cylindrical bore in the pump casing—is tightly pressed by the force P, which gives rise to the forces Q acting in the axial direction, and the forces $Q_1$ acting perpendicularly thereto, in the radial direction. The pressure Q is employed for tightly closing the pump chamber 6, whereas the transversal force $Q_1$ prevents the fuel from flowing from the suction chamber 7 in the pump casing 11 and surrounding the outer guide face of the piston cylinder to the threads of the screw plug 5 and farther on to the atmosphere. 8 is a threaded portion arranged in the central aperture of the supporting ring 2 by means of which the packing ring may be extracted or removed.

The single groove 9 illustrated in Fig. 1 may be replaced by several grooves 10, as shown in ring 2' according to Fig. 3.

Fig. 2 shows how the plastic material of the ring 1 enters into the groove 9 of the inner supporting ring 2 in consequence of its plastic deformation so that when extracting the ring 2 packing ring 1 is also removed.

Fig. 4 shows an arrangement in which the ring, from the very outset, fills the groove 9 of the ring 2. This arrangement is preferably employed whenever the ring 1 is made of a plastic mass, and is cast or pressed round the ring 2''.

When making the ring 1 of a packing mass consisting of a soft substance, incapable of absorbing considerable forces, it is recommendable to select the arrangement according to Figs. 5 and 6. In these cases the volume $V_1$ of the part of the ring 1''' protruding beyond the ring 2 is equal or smaller than the volume $V_2$ of the groove 9 in the inner supporting ring, so that same may take up, during deformation, the aforesaid volume $V_1$ enabling the parts 3 and 4 to rest against the solid supporting ring 2. This modification is recommended whenever the measures in assembling, must be observed with a particular accuracy.

What I claim is:

1. In a fuel injection pump, the combination comprising a pump casing having a cylindrical bore, a pump piston cylinder and a valve casing fixedly positioned in axial alinement in said bore and having their adjacent end faces arranged in axial spaced relation, a packing ring positioned in said bore between the adjacent end faces of said pump piston cylinder and valve casing, and means for axially urging and fixing said valve casing into said cylindrical bore and clamping said packing ring in position, said packing ring being made of a deformable packing material, and a non-deformable supporting ring provided with at least one annular groove in its outer circumferential wall mounted telescopically within said packing ring, said packing ring having a greater axial thickness than said supporting ring, whereby upon urging said valve casing into said cylindrical bore the packing ring is axially compressed and radially expanded so that a portion of the packing material enters said annular groove in said supporting ring while the outer circumference of the packing ring is caused to sealingly engage the cylindrical bore in said casing.

2. In a fuel injection pump, the combination as claimed in claim 1 and in which the inner circumferential wall of said non-deformable supporting ring is provided with a screw thread arranged to be engaged by a correspondingly threaded tool for removing the supporting ring and the packing ring from the cylindrical bore of said pump casing, said supporting ring being connected with said packing ring by the latter's radially expanded portion which has entered the annular groove of said supporting ring.

3. In a fuel injection pump, the combination as claimed in claim 1, in which the non-deformable supporting ring has flat end faces, and in which the cross sectional area of the packing ring is of a size to completely fill said annular groove when said deformable ring is radially deformed upon the axial compression thereof, in the deformed condition of said packing ring the adjacent ends of said pump piston cylinder and said valve casing being in direct contact with the opposed flat end faces of said supporting ring.

4. In a fuel injection pump for diesel engines, the combination comprising a pump casing having a cylindrical bore, a pump piston cylinder and a valve casing fixedly positioned in axial alinement in said bore and having their adjacent end faces arranged in axial spaced relation, a packing ring positioned in said bore between the adjacent end faces of said pump piston cylinder and valve casing in axial alinement therewith and having its outer circumferential wall in engagement with the cylindrical wall of said bore, and a tubular screw plug threaded into the pump casing and engaging said valve casing for axially urging and fixing the same into said cylindrical bore and for clamping said packing ring in position between said pump piston cylinder and valve casing, said packing ring consisting of deformable packing material, and a non-deformable supporting ring mounted telescopically within said packing ring, the outer circumferential wall of said supporting ring being in engagement with the inner circumferential wall of said packing ring, said packing ring having a greater axial thickness than said supporting ring and when axially compressed by the axial pressure exerted thereon by said valve casing when said casing is urged by said screw plug toward said pump piston cylinder, said supporting ring limiting the inwardly directed deformation of the deformable packing and causing the outer circumferential portion of said deformable packing ring to be tightly pressed against the cylindrical wall of said pump casing bore.

ANTON PISCHINGER.

REFERENCES CITED

The following references are of record in the file of this patent:

UNITED STATES PATENTS

| Number | Name | Date |
|---|---|---|
| Re. 11,858 | Merwarth | Sept. 25, 1900 |
| 135,127 | Katzenstein | Jan. 21, 1873 |
| 1,730,691 | Schlaich | Oct. 8, 1929 |
| 1,942,703 | Hubbard et al. | Jan. 9, 1934 |
| 1,957,435 | Baur | May 8, 1934 |
| 2,109,785 | Starr | Mar. 1, 1938 |
| 2,185,144 | Edwards | Dec. 26, 1939 |
| 2,200,212 | Bohmer et al. | May 7, 1940 |
| 2,417,494 | Hoof | Mar. 18, 1947 |

FOREIGN PATENTS

| Number | Country | Date |
|---|---|---|
| 537,654 | Great Britain | 1941 |